United States Patent [19]

Jackson

[11] Patent Number: 4,896,275
[45] Date of Patent: Jan. 23, 1990

[54] FULL PAGE GRAPHICS IMAGE DISPLAY DATA REDUCTION

[75] Inventor: Brian H. Jackson, Litchfield, N.H.

[73] Assignee: Bull HN Information Systems Inc., Billerica, Mass.

[21] Appl. No.: 72,210

[22] Filed: Jul. 10, 1987

[51] Int. Cl.$^4$ .............................................. G06F 15/66
[52] U.S. Cl. ................................... 364/519; 364/518; 340/131
[58] Field of Search ....................... 364/519, 521, 518; 340/750, 799, 723, 731; 382/48, 56

[56] References Cited

U.S. PATENT DOCUMENTS

| | | | |
|---|---|---|---|
| 4,608,607 | 8/1986 | Adachi | 358/260 |
| 4,628,534 | 12/1986 | Marshall | 382/41 |
| 4,631,521 | 12/1986 | El-Sherbini | 340/347 DD |
| 4,633,506 | 12/1986 | Kato | 382/56 |
| 4,635,212 | 1/1987 | Hatazawa | 364/518 |
| 4,644,477 | 2/1987 | Kojima | 364/523 |
| 4,646,356 | 2/1987 | Anderson et al. | 382/56 |
| 4,651,221 | 3/1987 | Yamaguchi | 358/260 |
| 4,658,430 | 4/1987 | Anderson et al. | 382/46 |
| 4,660,029 | 4/1987 | Houda et al. | 340/744 |
| 4,661,000 | 4/1987 | Shinbori | 400/83 |
| 4,663,660 | 5/1987 | Fedele et al. | 358/136 |
| 4,679,038 | 7/1987 | Bontz et al. | 340/721 |
| 4,761,643 | 8/1988 | Fujiwara | 340/723 |
| 4,785,296 | 11/1988 | Tabata et al. | 340/731 |

OTHER PUBLICATIONS

"Laser Printers Zap the Price Barrier", by Cary Lu, High Technology, Sep. 1984, pp. 52–56.

"Micros Get Graphic", by Cary Lu, High Technology, Mar. 1986, pp. 18–25 & 27.

Primary Examiner—Gary V. Harkcom
Assistant Examiner—Phy K. Nguyen
Attorney, Agent, or Firm—Faith F. Driscoll; John S. Solakian

[57] ABSTRACT

A program implemented method converts complex graphics and picture images in binary form into bit map representations which include only that image data which is essential for its reproduction by an output printer with limited buffer memory. The method includes the steps of storing a group of rows or block of the binary image data at a time in an input buffer, then analyzing a byte at a time, the row segment of image data thereby dividing the row segment into a number of cell matrices. Based upon the analysis of cell matrices, the method generates bit map representations describing only the essential or black data. Each bit map representation generated has a height corresponding to the number of horizontal scan lines and a length which corresponds to the number of consecutive cell matrices detected as containing black data. Only the essential image data contained in the generated bit map representations is transferred to an output buffer, along with generated horizontal and vertical positioning information, in addition to other parameter information required to reproduce the bit map representation. The above steps are repeated for each row segment or group of data defining each part of a page until the entire image has been processed.

17 Claims, 12 Drawing Sheets

FULL PAGE GRAPHICS IMAGE DISPLAY DATA REDUCTION

BACKGROUND OF THE INVENTION

1. Field of Use

The present invention relates to graphics image display systems and more particularly to a system for efficiently transferring graphics or picture image data to an output device.

2. Prior Art

As the advantages of graphics based computing continue to grow, the need for printing and displaying high quality complex images or pictures has increased. Laser type printers, because of their speed and clear printing qualities, have been used to operate as graphics printers.

Although capable of higher performance, laser printers differ greatly from conventional printers, such that current computer system designs may not take full advantage of their speed, particularly in the case of graphics applications.

In such applications, all graphics devices, whether screens or printers, operate with bit mapped images wherein each pixel in a bit mapped screen corresponds to a bit in a random access memory (RAM). To change the screen image, the software changes the contents of the video RAM. Non-laser graphics printers operate in the same way, except that the bit map need not be held in RAM all at once.

The typical dot matrix printer operates at a speed slow enough to permit a gradual build up of the bit map in RAM, one band of the image at a time. However, the faster laser printer normally requires a large memory buffer to store an entire page of bit mapped graphics. Only the more expensive models have included the one megabyte of storage required. Even then, it has been found that additional storage still may be required to provide adequate, temporary storage for variables and a variety of prestored fonts. For desired resolution, even more storage may be desirable.

Additionally, laser printers equipped with full page buffers still require sufficient time to fill the buffer with a full page of image information. As an alternative to pure bit mapping, graphics primitives have been employed. Such primitives are used to specify geometric objects, such as a line, for example, which is defined by its length orientation and width. However, graphics primitives may still not be adequate for printing very complex images.

To reduce the amount of image data transmitted, one approach is to utilize conventional data compression algorithms. However, the introduction of these algorithms requires modifications to be made to the laser printers and/or controllers to restore the compressed image to its original or uncompressed state.

Another approach is to place the printer into a graphics mode and only transfer lines of a graphics image containing essential nonzero (black) image data together with appropriate vertical incrementing commands. In this arrangement, if a line contains black image data close to the right hand margin, all of the zero (white) image data to the left of the image data is transmitted. The main advantage of this arrangement is that it primarily eliminates the need to transmit zero (white) image data when the entire line contains only white data. While reducing data transfer requirements, a substantial amount of white image data is still transmitted.

Accordingly, it is an object of the present invention to provide a method which reduces substantially, the amount of non-essential white image data which is required to be stored by an output device having limited storage, such as a laser printer.

Another object of the present invention is to provide data image reduction arrangement which is compatible with a standard graphics interface.

A still further object of the present invention is to provide an arrangement which can be efficiently implemented by a small amount of software executable on a variety of types of computer systems.

SUMMARY OF THE INVENTION

The above and other objects of the present invention are achieved by a method and system in which the binary image data of a graphic or picture of a page is scanned, a row segment corresponding to a group of scan lines/rows at a time. The image data within the lines of the row or group is examined a byte at a time, in effect, dividing the image data into a plurality of byte long cell matrices. Based upon an analysis of the contents of the cell matrices, the image data is converted into bit map representations containing only essential or black data.

Each generated bit map representation has a width corresponding to the number of rows/lines in the group and a length which corresponds to the number of consecutive bytes or cell matrices detected as containing black image data. The vertical and horizontal position information and the bit map representations containing black image data are transferred to an output buffer. From there, the bit map representations and position information are transferred to an output device, such as a laser printer, using standard graphic command sequences. In the preferred embodiment, the transfer is accomplished by transfer bit image program commands in which the length and width dimensions of the bit map representations are specified to be compatible with the output device.

In greater detail, the group of rows of image data (i.e., row segment/block) is first examined for the presence of any black data. If no black data is detected within any of the row, the next block or row segment is examined. When black data is detected, the block of image data is further reduced to a minimum number of bit map representations containing black image data. These bit map representations, together with the required vertical and horizontal position information, are transferred to the output device as part of the transfer bit map command.

The arrangement of the present invention reduces substantially the amount of white image data required to be transferred and stored by the output laser printer device. This allows the printer device with minimum buffer storage to reproduce a complete page of image data on a single sheet of paper.

The novel features which are believed to be characteristic of the invention both as to its organization and method operation, together with further objects and advantages, will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
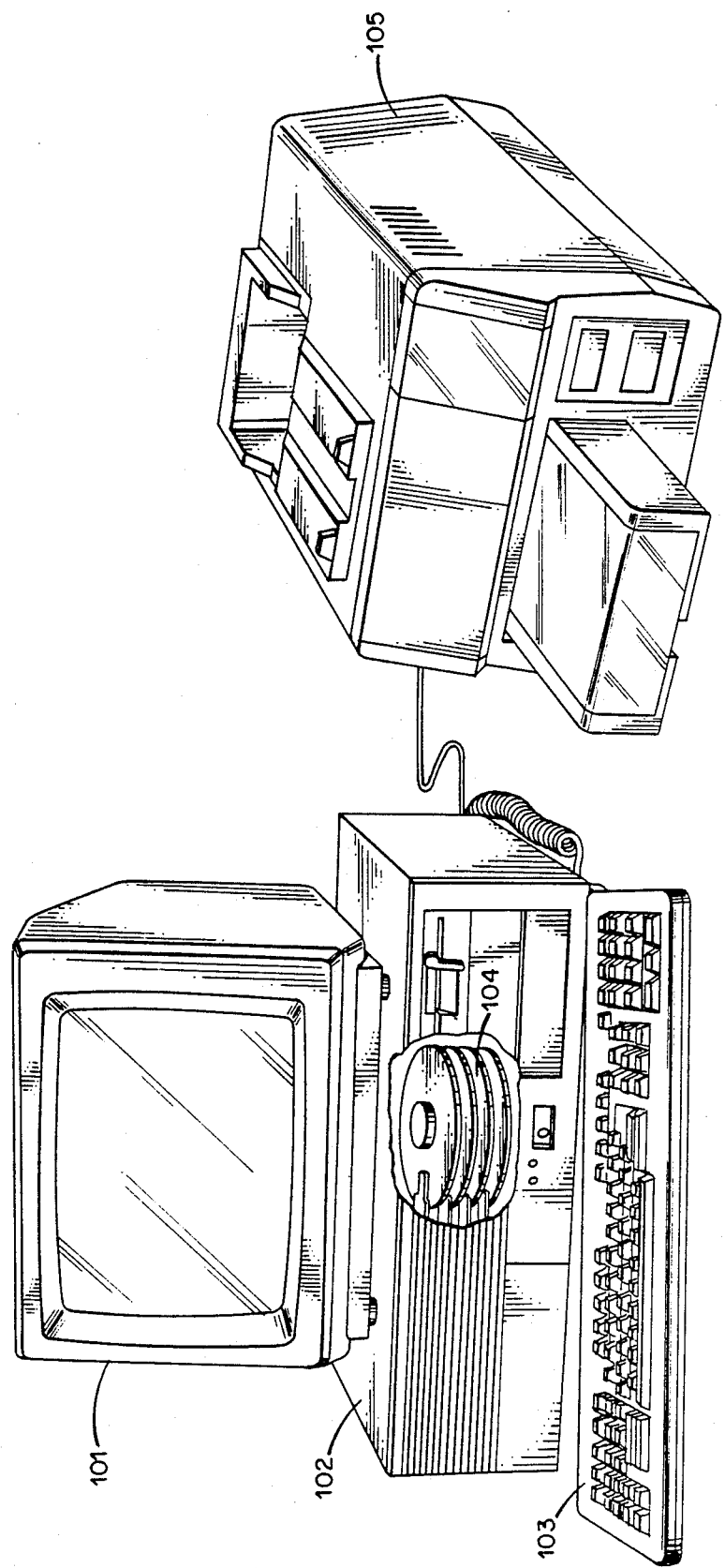
FIG. 1 is a block diagram of a system which utilizes the method of the present invention.

FIG. 1 shows a block diagram of a computer system which utilizes the method of the present invention. The system includes a personal computer 102 which couples to a laser printer 105. The system includes a CRT display 101 and keyboard 103. For the purposes of the present invention, all of the elements of FIG. 1 can be considered conventional in design. For example, the computer 102 may be a Honeywell Bull AP computer or other IBM compatible personal computer. As such, computer 102 includes hard disk storage 104, a random access memory RAM and a microprocessing unit. The laser printer 105 may be a Honeywell Bull model 80 printer or Ricoh printer which has substantially less than a full bit map image memory storage.

It is assumed that the system of FIG. 1 is being used as a graphics workstation. As such, the particular application program being executed is stored on the computer's hard disk storage 104. An operator creates picture images or graphics using keyboard 103 which are, in turn, displayed on the screen of the CRT display 101.

These images are then stored as files on disk 104. A driver program incorporating the principles of the present invention establishes the interface between the user application program and laser printer 105. The driver program can be assumed to be also stored on disk 104. In general, the operator, by depressing certain keys of keyboard 103, can print the image displayed on the screen at any time.

The displayed image may be quite complex. As for example, it could take the form of the complex picture image shown in FIG. 9a. As such, it could require considerable time to transfer and may only be able to be printed out a part of a page at a time. This normally occurs in the system of FIG. 1 where laser printer 105 has less than a half of a page of image memory storage. The method of the present invention permits a full page image to be printed out on a single page without requiring any modifications to be made to laser printer 105.

Figure 2:
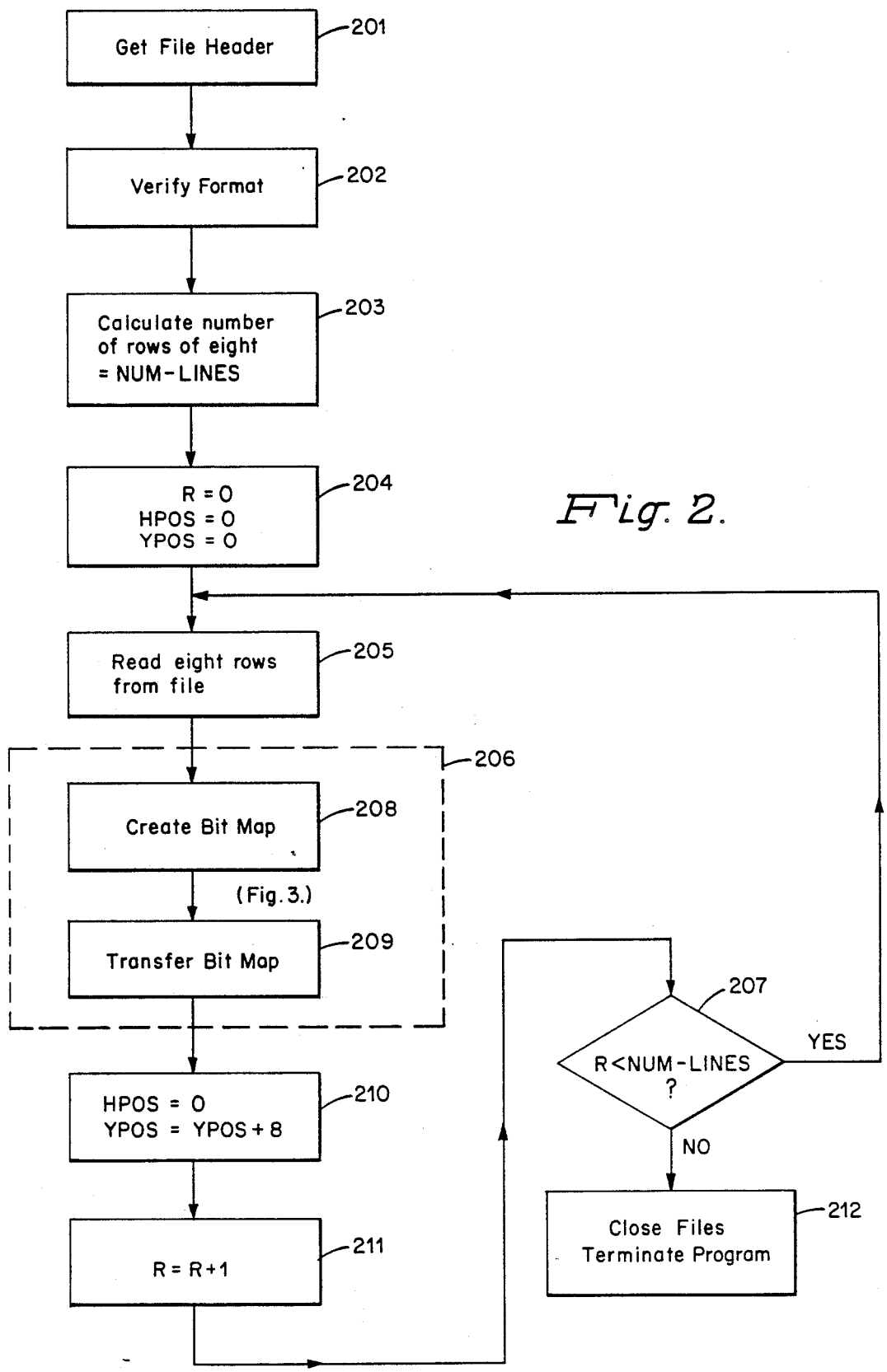
FIGS. 2 through 6 are flow charts used to explain the method of reducing graphics image data according to the teachings of the present invention.

The driver program is organized as shown in FIG. 2 to implement the method and system of the present invention. As shown in FIG. 2, the program includes subroutines of blocks 201 and 202 which fetch the image data from disk 104 and perform any necessary header and format checking operations to ensure that the correct file data has been fetched.

The program further includes a subroutine 203 which calculates the value of a variable NUM-LINES. This variable establishes the number of passes which are required to be made through the subroutines of blocks 205 through 207. The value corresponds to the number of groups/row segments (i.e., rows of 8 horizontal scan lines) of scan lines of the page of image data to be printed by printer 105. This subroutine is followed by a subroutine 204 which initializes the variables R, HPOS and YPOS designating counter, horizontal position and vertical position information respectively. These variables correspond to register working locations in RAM.

Subroutine 204 is followed by a subroutine 205 which fetches from disk 104 a group of image data from the image data file. The driver program further includes create bit map subroutine 208 and transfer bit map subroutine 209. According to the present invention, these subroutines analyze the image data from the file and convert the image data into bit map representations which are thereafter transferred to printer 105 as described herein.

These subroutines are followed by subroutines 210 and 211 which initialize the variable HPOS, increments YPOS by eight, and increments variable R (row segment) by 1 in preparation for processing the next group of image data. A test subroutine 207 is used to determine when all of the image data of a page has been processed at which time a subroutine 212 closes the files and terminates the application program.

Figure 3:
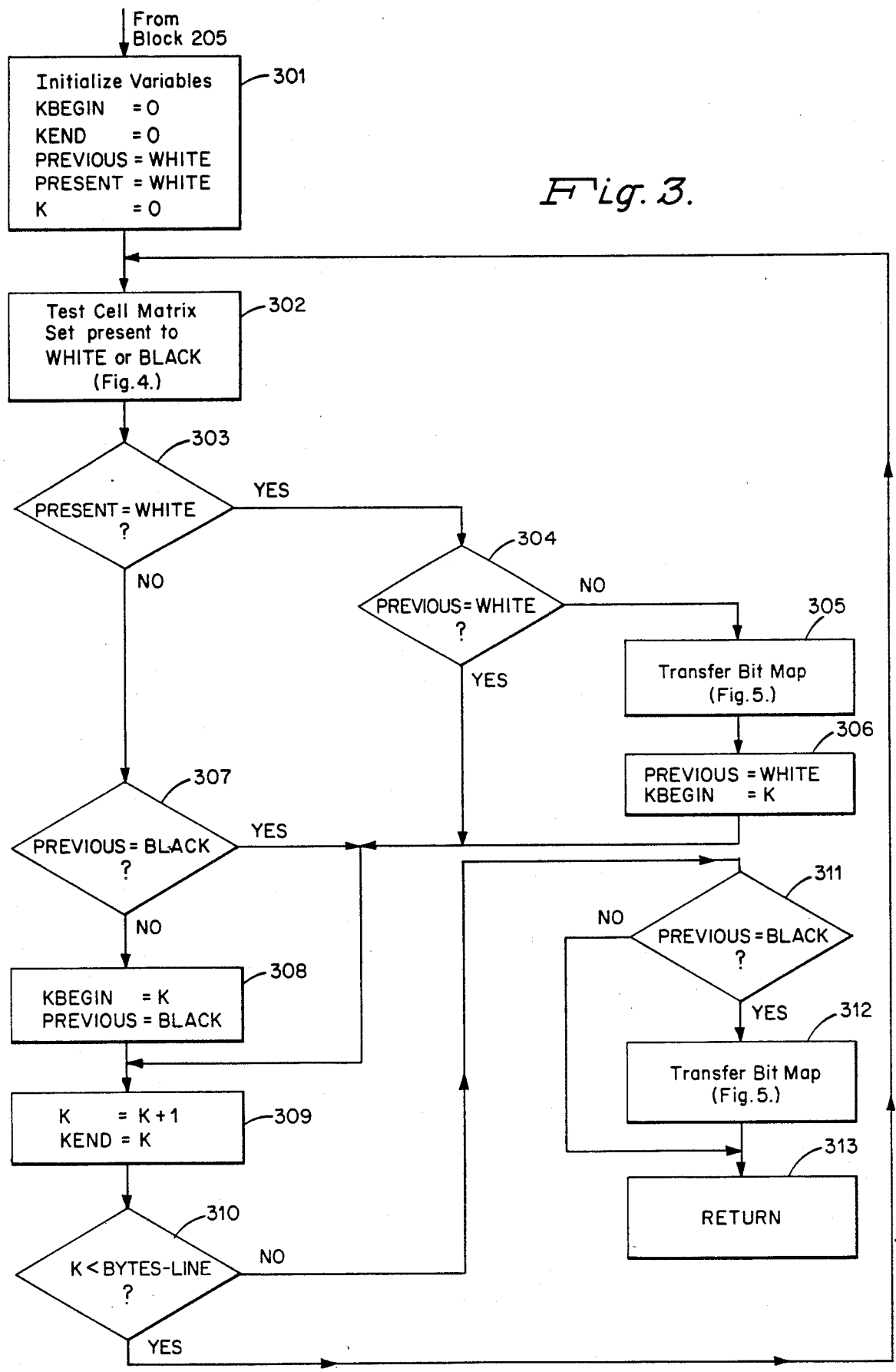

FIG. 3 shows in greater detail, the create bit map and transfer bit map subroutines of the present invention. As seen from FIG. 3, the subroutines include a test cell matrix subroutine 302 shown in greater detail in FIG. 4. This subroutine tests each cell matrix for the presence of WHITE or zero image data. FIG. 5 shows in detail, the transfer bit map subroutine of block 209. This subroutine includes a set X and Y position subroutine which is designed to be printer specific to the extent of defining the required X and Y position information and other parameters contained in command strings which control printer 105 as described herein.

DESCRIPTION OF OPERATION

With reference to FIGS. 1 through 6, the method of the present invention will now be described in connection with transferring a bit image data representation of the picture image of FIG. 7. For ease of explanation, it is assumed that the 72 column by 16 row of BLACK (1's) and WHITE (0's) image shown in the upper part of FIG. 7 covers an entire page. However, it will be appreciated that for a full page image at a resolution of 150 dots per inch, a printed page or columns actually contains 1280 dots/pixels in the horizontal direction and 1650 scan lines or rows in a vertical direction. Thus, the image of FIG. 7 in actually has a length of approximately one-half inch (i.e., 72 dots/pixels horizontally). In appearance, the image of eight scan lines has been magnified by a factor of 16 and normally would appear as several thin lines similar to those shown in FIG. 9a.

Figure 7:
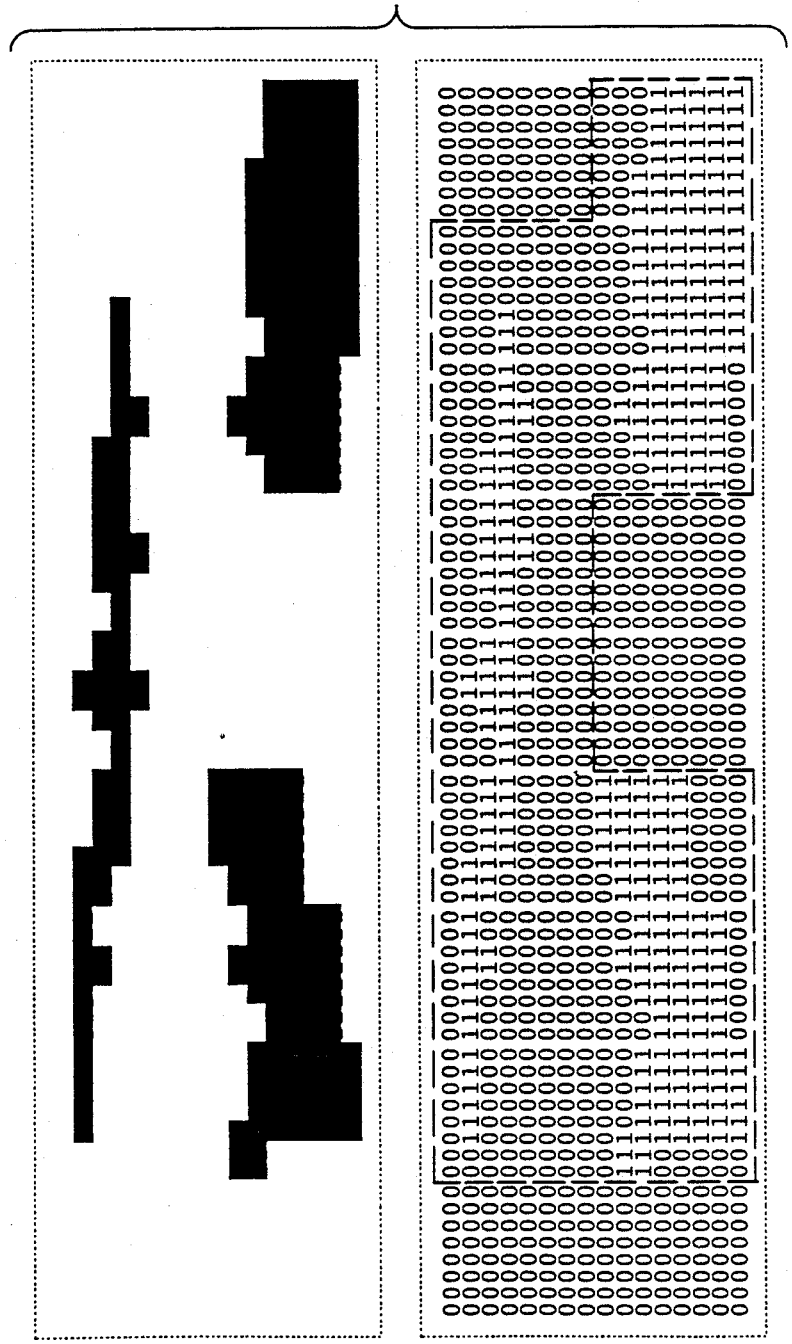
FIG. 7 shows a graphics or picture image used to explain the present invention.

The lower part of FIG. 7 shows the white (0) and black (1) dots or bit mapped image representation for the image of FIG. 7. Dotted lines are used to outline the bit map data which would be transferred to printer 105. Similarly, FIG. 9b shows in black, the actual bit map data which would be transferred to printer 105, in the case of the complex image of FIG. 9a.

Figure 9A:
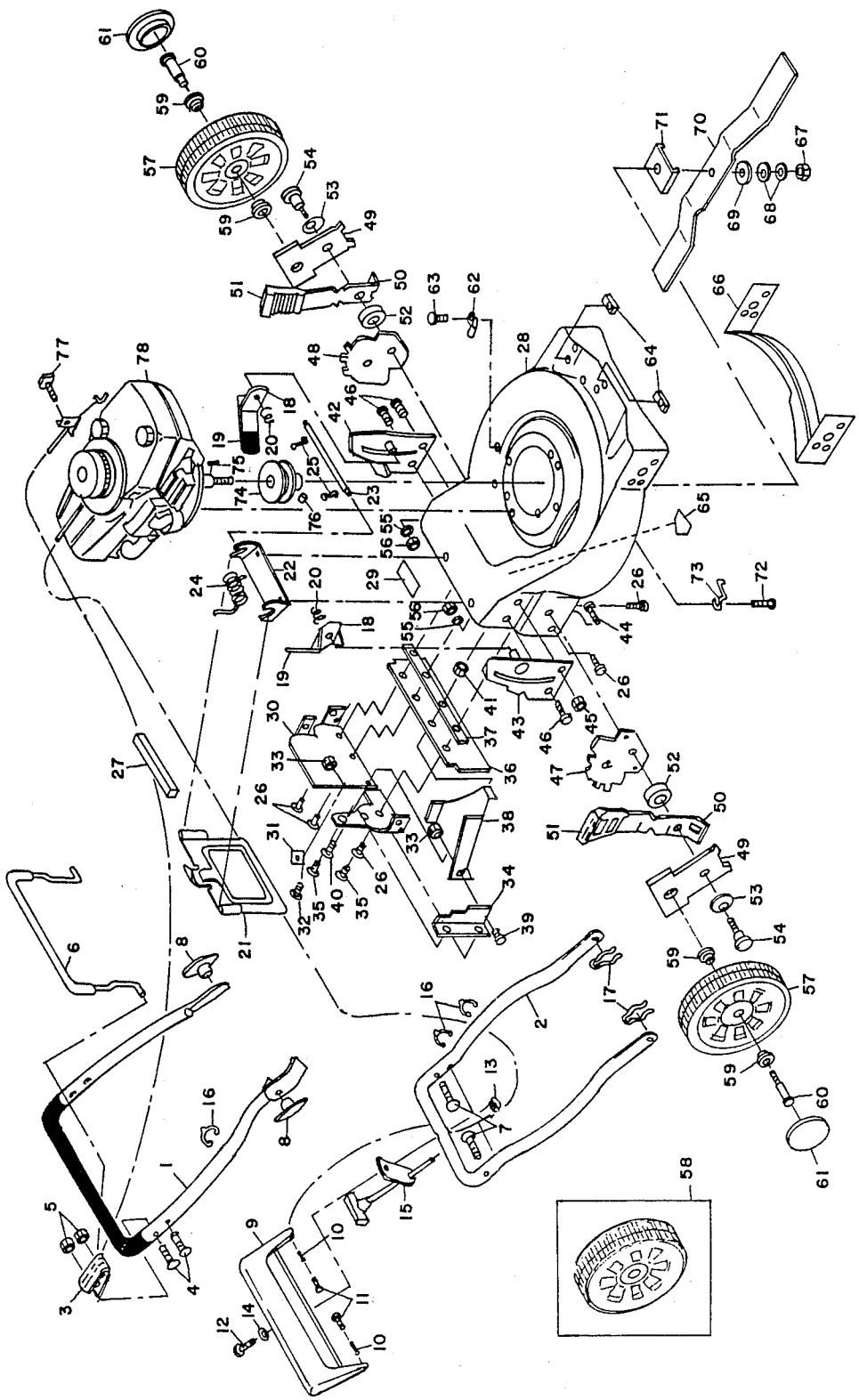
FIGS. 9a and 9b show a complex graphics image and the corresponding bit map representations generated for that image respectively.
Figure 9B:
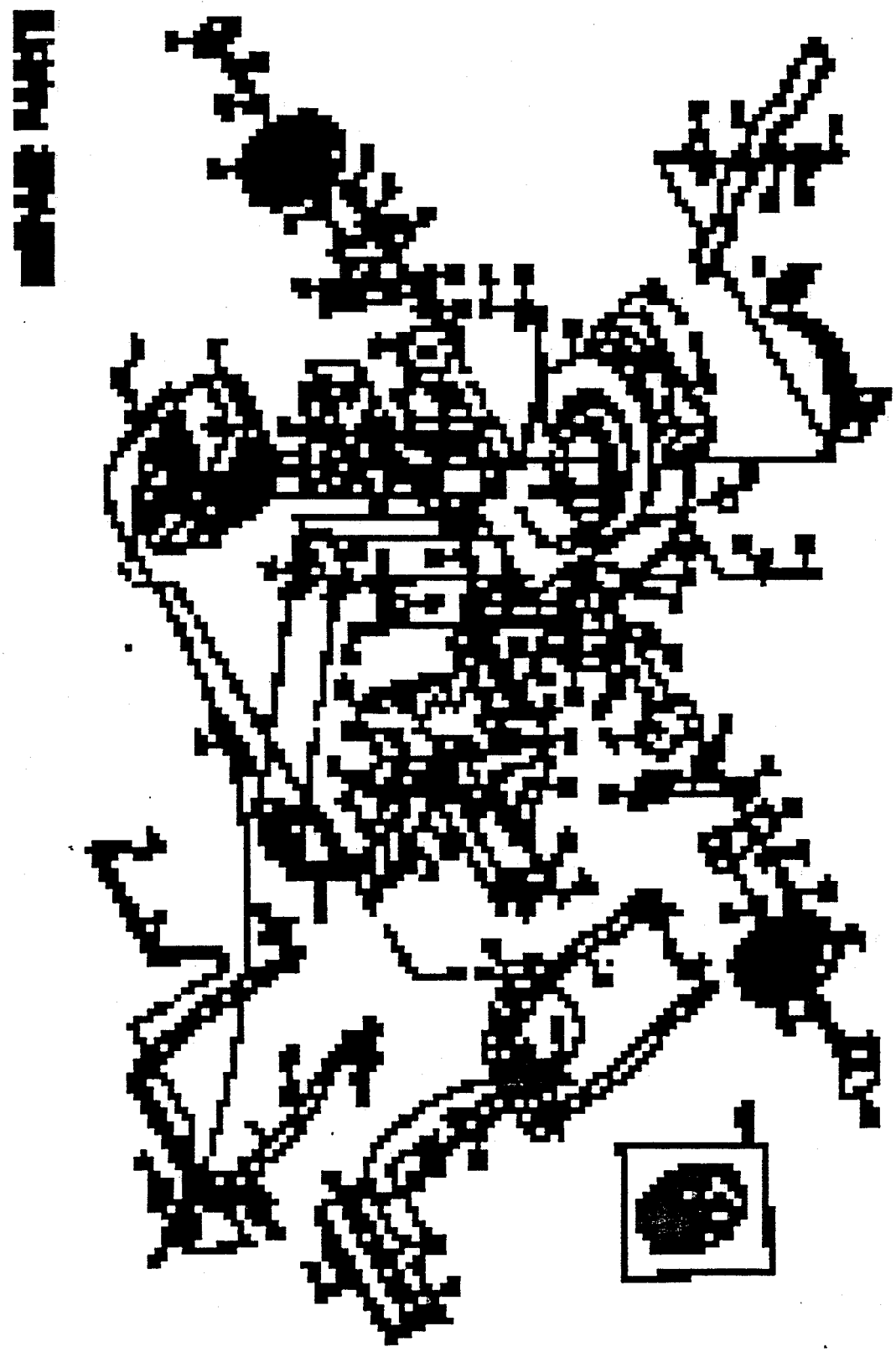

From a comparison of FIGS. 9a and 9b, it is seen that a minimum amount of image data is required to be transferred for reproducing the complex image of FIG. 9a. This enables printer 105 to print an entire page without having to increase its image buffer storage and also reduces the transfer time.

The method of the present invention will now be described relative to processing the picture image data of FIG. 7. As shown, block 201 of the driver program of FIG. 2, reads the file header information into RAM from the file on disk 104 containing the picture image of FIG. 7. The file header information contains the number of scan lines in the image, the number of 8-bit bytes per scan line, the required output dots per inch (DPI), in addition to other optional information. Block 202 verifies the format of the file to insure that the number of scan lines, byte per lines and DPI are compatible with printer 105.

As seen from FIG. 2, the subroutine 203 calculates the number of blocks/row segments or rows of eight horizontal scan lines to be processed. Here, since the image data file contains 16 horizontal scan lines or rows, the variable NUM-LINES have a value equal to 2. As indicated by block 204, the horizontal and vertical position variables HPOS and YPOS are initially set to zeros.

Figure 8A:
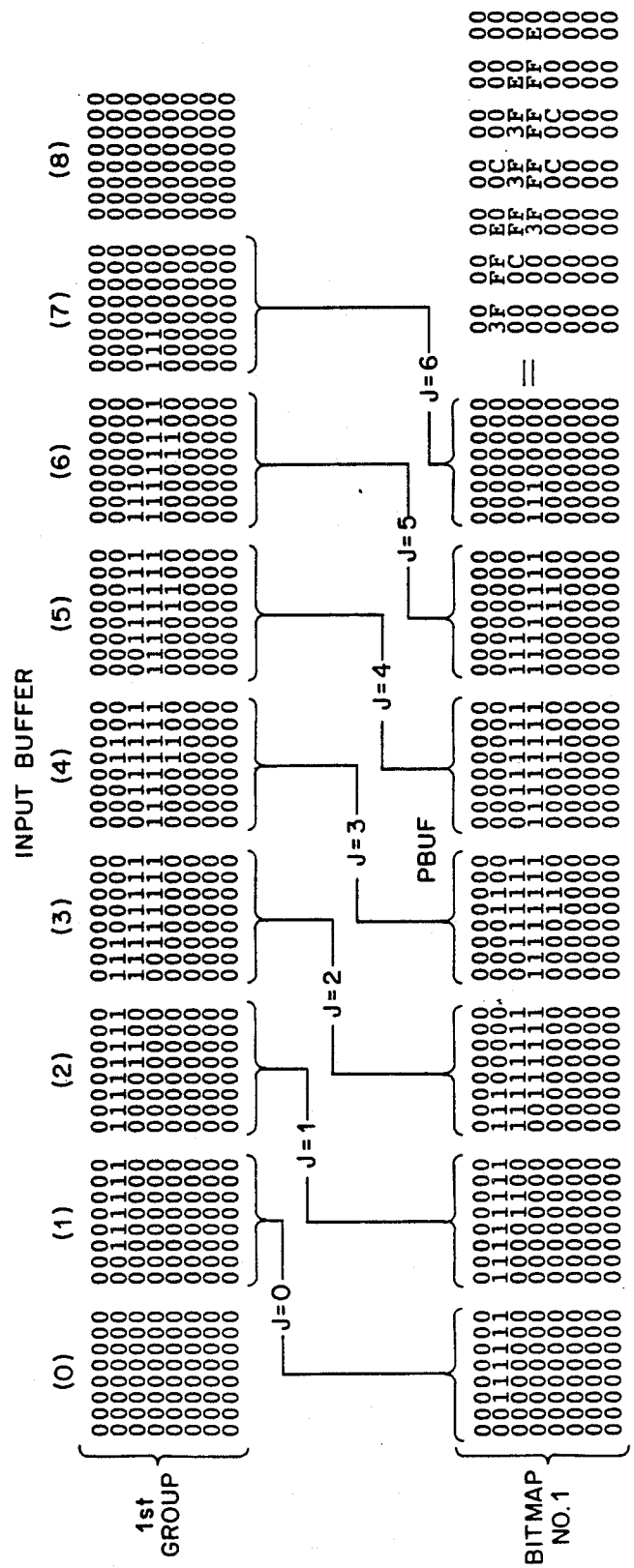
FIGS. 8a through 8c are diagrams used to explain the present invention.

As indicated, block 205 reads the first eight rows of image data from the disk file into an input buffer as shown in FIG. 8a. The input buffer corresponds to an assigned area of RAM. As shown in FIG. 2, the driver program sequences to block 206 which is shown in greater detail in FIG. 3.

As mentioned, block 206 performs the functions of creating bit maps and transferring the bit maps to printer 105. For the purposes of this example, a bit map is the bit mapped image information stored in the file which is examined or analyzed eight horizontal scan lines at a time, using byte wide increments. This results in the generation or creation of bit maps having the characteristics of being eight horizontal scan lines in height and having a length which is proportional to the length of consecutively occurring bytes of BLACK (1) image data. Thus, the contents of the input buffer can be viewed as containing nine 8×8 cell matrices.

With reference to FIG. 3, it is seen that block 301 initializes the variables KBEGIN through K to the indicated values. The variable KBEGIN is a pointer that marks the start of BLACK (1) image data and the variable KEND is a pointer that marks the end of BLACK data. PRESENT is a variable which defines the state of the cell matrix pointed to by K, and PREVIOUS is a variable which defines the state of the previous cell matrix. Lastly, the variable K is used as a pointer to the 8×8 bit cell matrix that is being examined. After the initialize operation, the driver program sequences to the test cell matrix subroutine 302 of FIG. 4. As mentioned, subroutine 302 determines the presence of any BLACK data or dots within the byte wide increment specified by the variable K which was initially set to a zero value. This enables the analysis or the examination of the image data to be started at the upper left hand corner of the graphics/picture image (i.e., at position x=0, y=0).

In this example, the result of analyzing the first cell matrix (i.e., matrix 0 of FIG. 8a) is that the program after sequencing through blocks 402 through 407 and 408 and 409 causes block 411 to set the variable PRESENT equal to WHITE (0). This means that all the image data contained within cell matrix 0 was all WHITE (all 8 rows contained no information (all zeros) important to the creation of the image).

Upon the completion of the test cell matrix subroutine 302, the driver program returns to FIG. 3. As indicated by block 303, the program next tests the state of the PRESENT variable. Since the PRESENT variable was set to WHITE, program flow sequences to block 304. Since the variable PREVIOUS was set to WHITE, block 304 causes the driver program next to sequence to block 309.

As shown, block 309 sets the variables K and KEND to K+1 and K respectively. This is followed by block 310 testing the value of variable K. Since this is the start of the block or line of the page, the program sequences back to the test cell matrix subroutine 302. The same sequence of operations is repeated for cell matrix 1 of FIG. 8a. However, as seen from FIG. 8a, this time subroutine 302 just sequences through block 402. That is, block 403 detects that the second row (K+1*N) does not equal 0. That is, it contains BLACK (1) data as shown in FIG. 8a. Hence, the block 403 sequences to block 410. As indicated, block 410 sets the variable PRESENT to a BLACK or 1 state, and subroutine 302 returns to FIG. 3.

The results of the test performed by block 303 sequences the program to block 307. Since the variable PREVIOUS is not BLACK (i.e., 0), program flow sequences to block 308. Block 308 performs operations of setting variables KBEGIN and PREVIOUS to the values K and BLACK, respectively. The state of the variable KBEGIN denotes the start of the BLACK image data.

As seen from FIG. 3, next block 309 updates the pointers K and KEND, and the driver program returns to block 302. During this pass, test cell matrix subroutine 302 performs a similar sequence of operations in analyzing cell matrix 2 of FIG. 8a, since it contains a consecutive byte of BLACK image data (i.e., 1's within the second row of the matrix). That is, since the image data is still BLACK, block 410 again sets the variable PRESENT to BLACK (1) and returns to FIG. 3.

Again, the result of the test performed by block 303 program flow sequences to block 307. During this pass, since variable PREVIOUS was set to BLACK, program flow bypasses block 308 and now sequences to block 309. Block 309 again updates variables K and KEND. That is, K is again incremented by ONE, specifying that cell matrix 3 is the cell matrix to be next examined. As shown in FIG. 3, the block 310 returns to block 302. The examinations of cell matrices 3 through 7 proceed substantially the same as cell matrix 2, since they contain consecutive bytes of BLACK image data.

During the ninth pass, test cell matrix subroutine 302, during its examination of cell matrix 8, detects an absence of BLACK (1) data. More specifically, subroutine 302 sequences through blocks 402 through 409, and as a result of all WHITE (0) being detected in all eight rows, block 411 sets the variable PRESENT to WHITE. Subroutine 302 returns to the create bit map subroutine 206 of FIG. 3. Since the state of the variable PRESENT is WHITE, block 303 sequences the subroutine to block 304. The result of testing the variable PREVIOUS performed by block 304 causes the subroutine 206 to sequence to the transfer bit map subroutine of block 305 of FIG. 5. At this point, the bit map representation for the first data block is deemed complete (i.e., no more consecutive BLACK image data bytes).

As seen from FIG. 5, subroutine 305 first establishes the values for the variables J, L, M and N. The consecutive passes through FIG. 3 resulted in KBEGIN having a value of 1, and KEND having a value of 8. Therefore, the variable L is set to the value 7 defined by the difference between KEND and KBEGIN. The variable M designates the start of the black image data to be moved from the input buffer. Here, M has the value 1 (i.e., cell matrix 1). The variable N corresponds to the number of bytes in a horizontal scan line in the buffer. Typically, N has a value of 160. However, in this case, it is assumed that the horizontal dimension of the page equals nine cell matrices. Therefore, N is set to the value 9. The variable J is set to 0. This variable serves as a pointer for identifying the row of BLACK image data to be transferred from the input buffer to the print buffer (PBUF) which corresponds to a previously assigned output buffer area in RAM. Thereafter, the BLACK image data is transferred to the printer.

As seen from FIG. 5, block 502 transfers the first line of the image data from the input buffer position which is identified by the variable J (i.e., 0), plus the variable M (i.e., 1) to the position in PBUF identified by the variable J times L (0). Block 502 transfers the second line of image data from the position in the input buffer pointed to by the variable J (i.e., 0) plus the variable M (i.e., 1) plus the variable N, in this case, 9, to the position in the print buffer identified by J which equals to 0 plus L which has the value 7. Block 502 transfers the third through eighth lines of image data from the input buffer in a similar fashion. The address of the input buffer data is calculated by J=0, M=1 and N (9), times the number of the row (i.e., 2 through 7). This data is transferred to the print buffer PBUF specified by the value J=0, 0 plus L=7, times the number of the row (i.e., 2 through 7).

Figure 4:
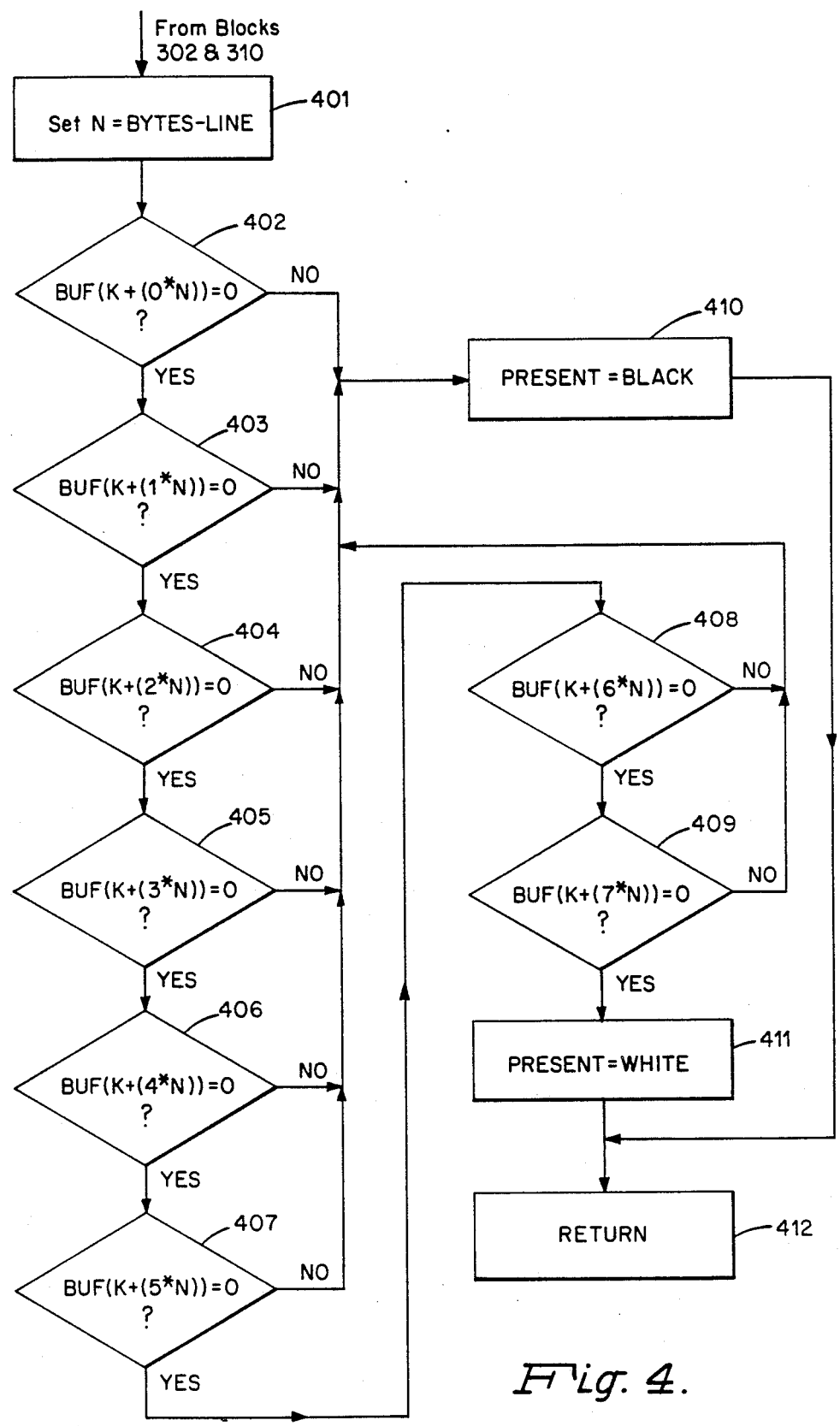
Figure 5:
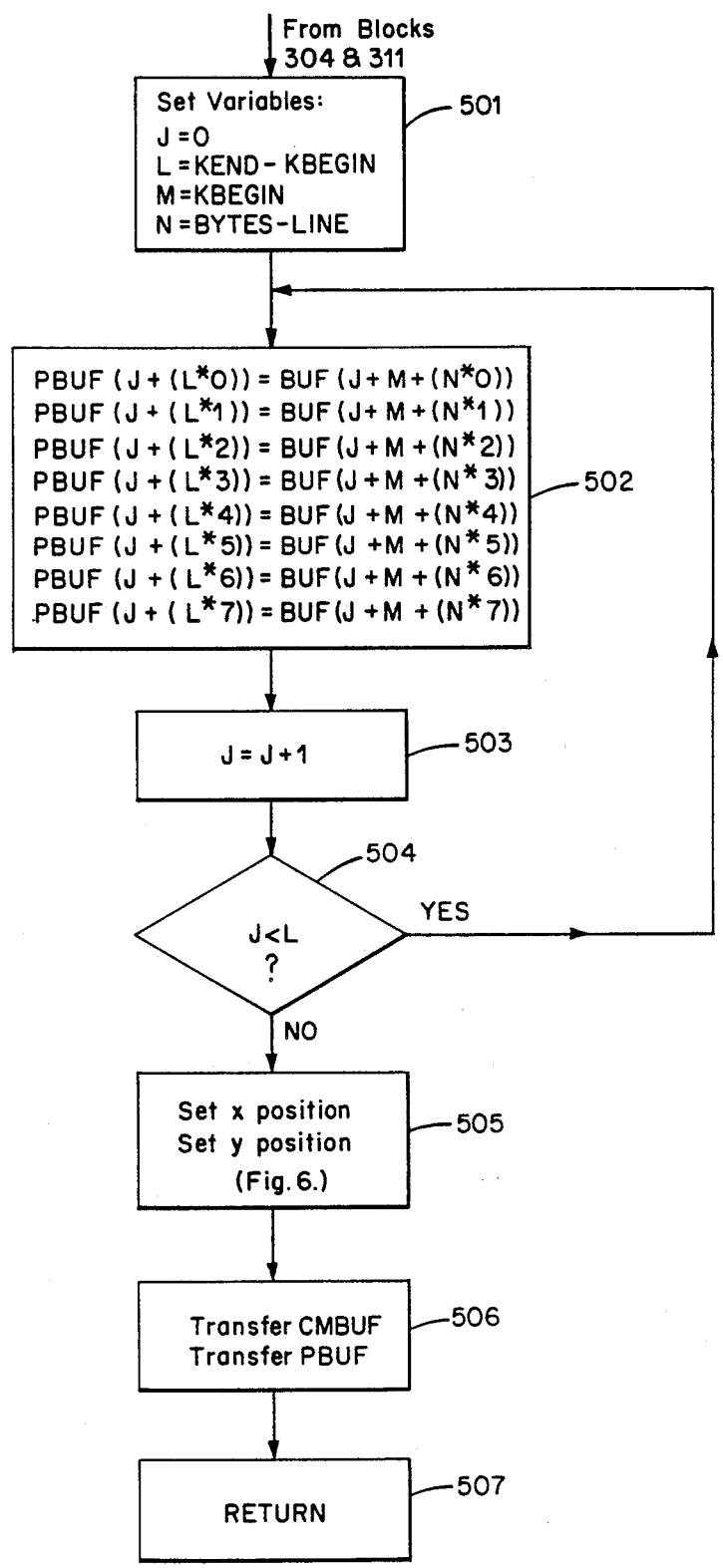

As seen from FIGS. 4 and 8a, the image data transfer continues until J reaches a value of 7. At this time, PBUF contains the BLACK image data shown in FIG. 8a. A hexadecimal representation of the PBUF data is shown to the right of the binary data. At this time, block 504 causes subroutine 209 to sequence to subroutine 505, shown in greater detail in FIG. 6. The function of subroutine 505 is to generate or set the X and Y position for laser printer 105. That is, this subroutine sets up the printer specific information and commands which are loaded into a command buffer area (CMBUF) in RAM. This information precedes the BLACK image data information generated by the invention.

First, block 601 sets of the variables BITS-WIDE through VPOS as indicated. That is, block 601 sets the variable BITS-WIDE to a value equal to eight times the variable L which has the value 7. The variable NUM-LINES is set to the value 8 to represent the number of scan lines/rows that are being processed. The variable HPOS is set to its previous value of HPOS plus KBEGIN times the printer defined constant INC having the value 720 divided by the dots per inch (DPI) constant (i.e., 150). For this example, the variable HPOS is set to the value 38. That is, HPOS=0+(8×720/150)=38.

The variable VPOS is set to the value YPOS which as a value 0 times the constant INC (170) having the value 720 divided by the constant DPI (150). Therefore, the variable VPOS is set to a value of 0. That is, for printer 105, the horizontal starting position can be specified as any multiple of 1/720" from the left limit and the vertical starting position can be specified as any multiple of 1/720" from the top limit.

Following the setting of the variables by block 601, subroutine 505 sequences through blocks 602 through 606. Since the constant DPI has the value of 150, the subroutine executes block 607 which results in the printer magnification constant MAG being set to a value of 2. The value of constant MAG is reflected in the value of parameter or byte M4 as described herein.

Figure 6:
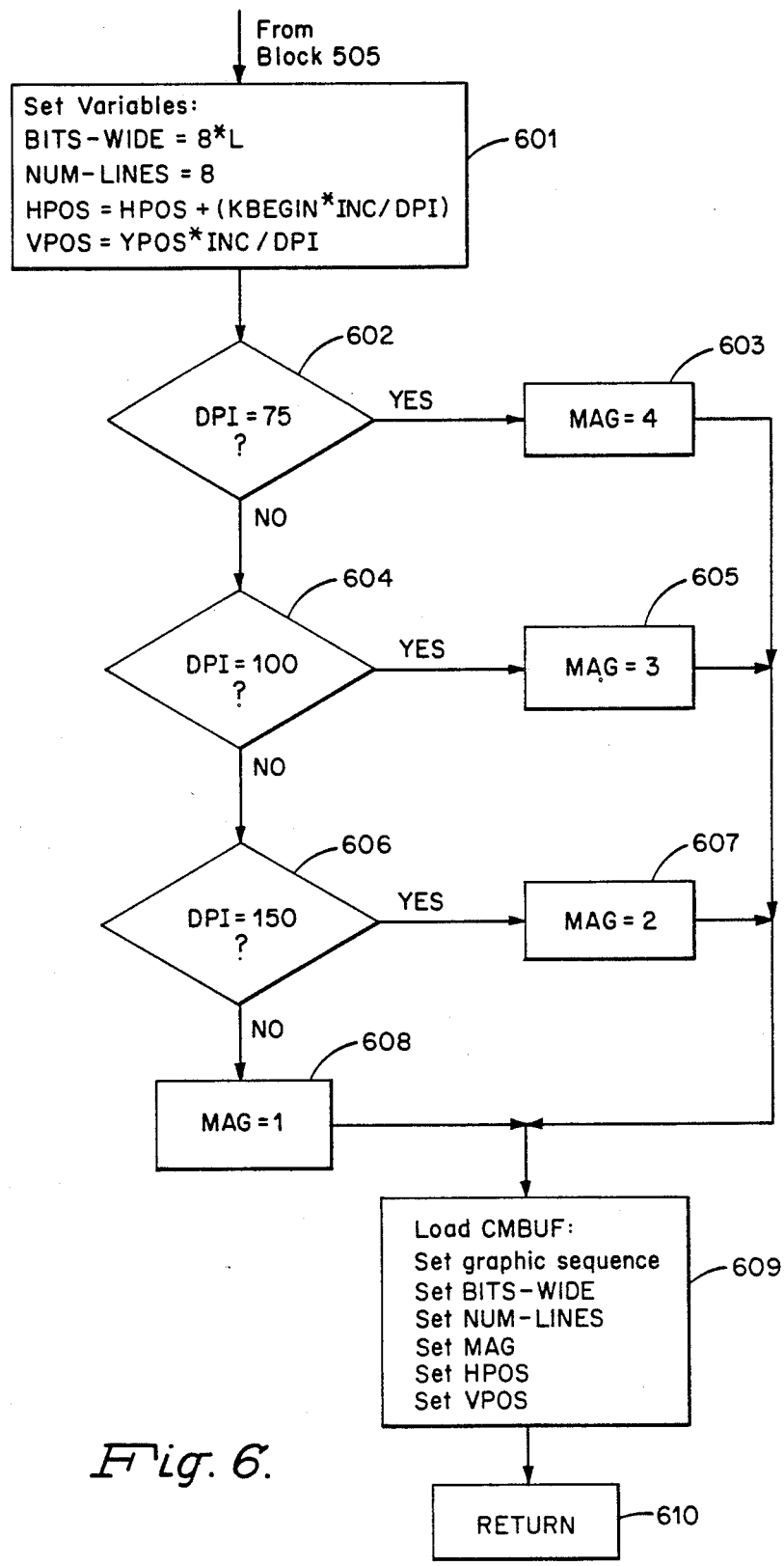

As shown in FIG. 6, subroutine 505 then sequences to the load command buffer (LOAD CMBUF) subroutine of block 609 which loads the appropriate printer command information into the CMBUF required for printing the BLACK image data previously stored in PBUF. The image data is transferred to printer 105 using a TRANSFER GRAPHIC DATA command which specifies transfer of graphic data and operates to switch printer 105 to the bit image mode. This type of command is command to most printers. For further information regarding this type of command, reference may be made to the publications, "Model 80 Printer Programming Handbook", dated January 1987, Copyrighted 1987 by Honeywell Information Systems Inc., Order No. HK12-00 and "Ricoh LP4080R/4081R Laser Printer Programmer's Manual". The arrangement of the invention makes use of a standardized printer interface and obviates any need to make modifications to printer 105.

In greater detail, the LOAD CMBUF subroutine loads the sets of the graphic sequence through VPOS parameters as follows. First of all, it sets the graphic sequence parameter which specifies to printer 105 the particular operation which it is to perform. In this system, the graphic sequence characters or bytes are set to the hexadecimal code values 1B, 12, 47 which specify the transfer of graphic data. The graphic sequence is followed by a number of parameters M1 through M7 which are strings of ASCII characters which define scanning format and other criteria necessary for printing graphic data bytes as described in the referenced printer publication materials.

In the system, the parameter M1 is an ASCII character having a value from 1 to 4 which defines the scanning format. In this particular case, printer 105 is to operate using horizontal scanning with 8-bit format. Therefore, parameter M1 is assigned a value of 3. Parameter M2 is a string of 1 to 4 ASCII characters coded to specify the width in dots of the area to be scanned for printing. For this transfer, M2 specifies that the width of the bit map image data to be transferred is 56 bits (7 bytes). Thus, M2 is set to the value calculated for the variable BITS-WIDE.

The parameter M3 is a string of 1 to 4 ASCII characters coded to specify the height in dots (i.e., number of scan lines) of the area to be scanned for printing. In this case, the value for M3 is always set to 8. The product of the two parameters M2 and M3 define the size of the bit map being transferred.

The parameter M4 defines the scale magnification (MAG). M4 is the ASCII character having a value of 1 to 4. As mentioned, the value MAG specified the scale magnification of 2 representing 150 dots per inch. That is, each dot printed is only 1/300" wide. Therefore, a magnification of 2 provides a width of 1/150".

The parameter M5 is reserved for future use and is always set to a value of 1. The parameter M6 is the horizontal starting position offset specified as a string of ASCII characters. M6 defines the horizontal position at which scanning begins. As mentioned, it is a multiple of 1/720" from the top page limit. Here, M6 is equal to the value of the variable HPOS and has a value of 38.

M7 defines the vertical position at which scanning begins. As mentioned, it is a multiple of 1/720" from the top of the page. Here, M7 is set to the value of VPOS which is a 0. The string of command parameters stored in CMDBUF are terminated by the ASCII character "@" having the hexadecimal value 40. This value is a delimiter character used by printer 105.

The LOAD CMBUF subroutine returns to block 506 of the transfer bit map subroutine of FIG. 5. Block 506 transfers the command contents of CMBUF and bit image contents of PBUF of FIG. 8a to printer 105. The printer, upon receiving the command and data of FIG. 8a, switches to the bit image mode and stores in its buffer memory, the bit image data denoting the settings of dots (black or white) of the image. Upon receipt of sufficient bit image information to fill its buffer memory (here equivalent to a full page), it prints the graphic image at rapid speed.

Figure 8B:
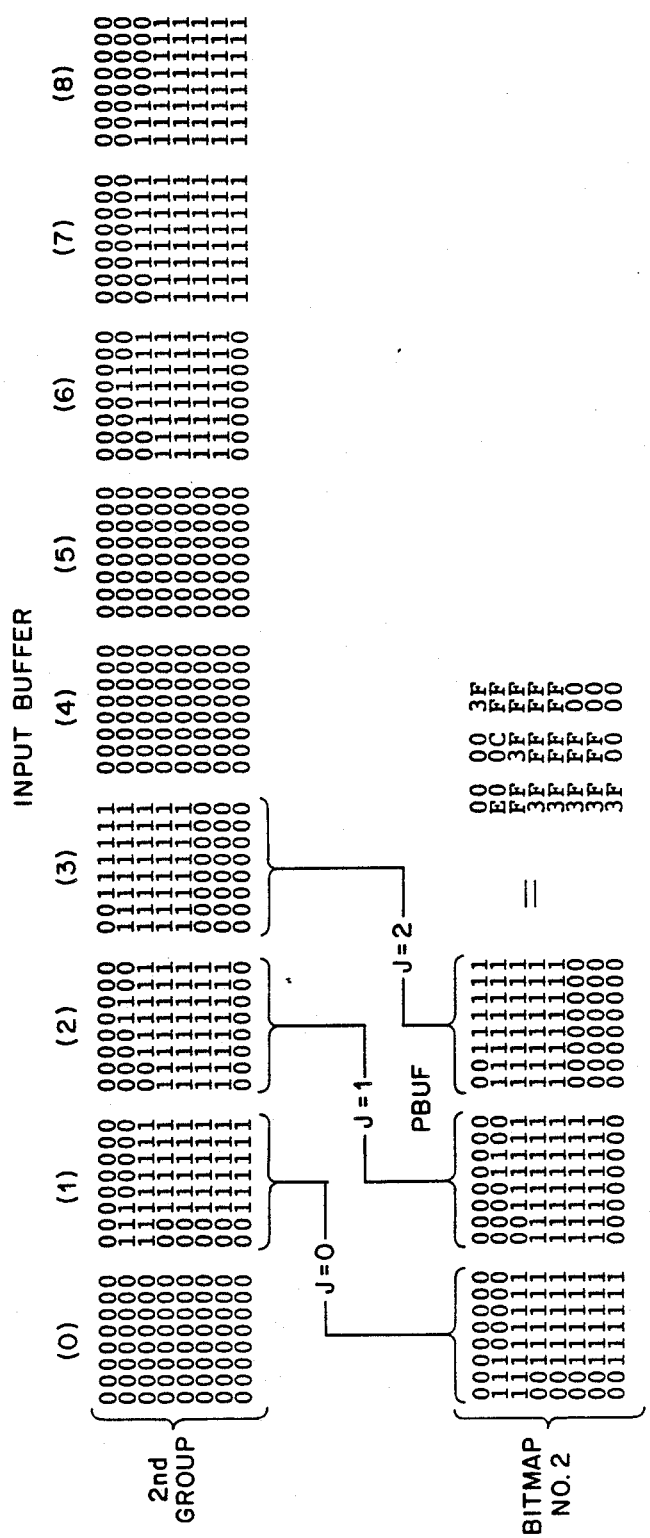
Figure 8C:
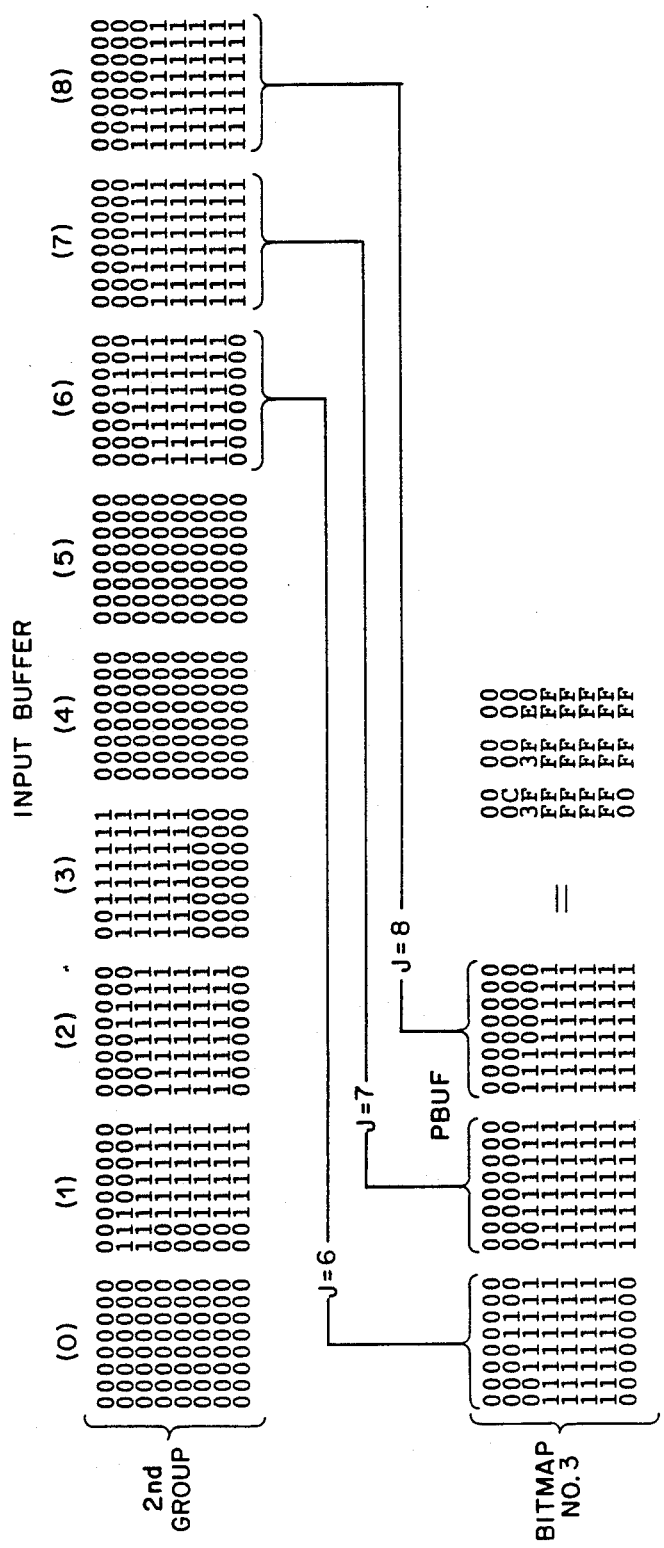

With reference to FIG. 8a, it was shown how the binary image information of the first data block corresponding to nine cell matrices was converted into a single 8 scan lines×7 byte bit map representation. FIGS. 8b and 8c illustrate how the second data block of image information stored in the input buffer is transferred. Since the second data block does not contain a continuous black image area, the nine cell matrices examined are converted into 2 successive bit map representations.

The first bit map representation is stored in PBUF which is normally cleared after the completion of the first transfer of image data. The length of this bit map is 3, and it starts and stops as shown in FIG. 8b. In a similar fashion, LOAD CMBUF subroutine generates the graphic sequence and other ASCII character strings in a manner described above. This corresponds to the second transfer having the values indicated in FIG. 8b.

In greater detail, after the transfer of the first bit map representation and the accompanying command information shown in FIG. 8a, subroutine 305 returns to block 306 of FIG. 3. This block sets the variable PREVIOUS to WHITE or a zero value and sets the variable KBEGIN to the value K. At this time, K has the value 8.

The program sequence to block 309 updates K and KEND to the values indicated. Next, block 310 tests the value of BYTES-LINE and, since K equals the number of BYTES-LINE (i.e., the value 9), the driver program sequences to block 311. Block 311 tests the state of the variable PREVIOUS. Since it has a value which equals WHITE, flow sequences to the box 313 which returns subroutine 206 to block 210 of FIG. 2. As seen from FIG. 2, block 210 sets variable HPOS to the value 0 and increments variable YPOS by 8. This establishes the correct horizontal and vertical positions defining values for the next area or data block/row segment of eight horizontal rows of image data to be processed by the program. This corresponds to the second block of coded patterns of binary image data of FIG. 7.

As shown in FIG. 2, block 211 increments the variable R by 1, which points to the second block as the next image data to be processed. Block 207 tests the value of R to determine whether processing has reached the end of the page. Since the end of the page has not been reached, program sequencing returns to block 205. As shown, the next block or set of eight horizontal rows are read from the disk image data file and loaded into the input buffer.

In the manner previously described, the image data is examined or analyzed for the start of the black image data which is detected to occur at cell matrix 1 and continue through cell matrix 3. Upon completing the analysis of matrix 4, the create bit map subroutine 206 sequences to the transfer bit map subroutine 305 of FIG. 5. Again, block 501 sets the variables J through N to the values. Thereafter, the rows of cell matrices 1 through 3 containing BLACK image data are transferred into PBUF in the manner previously described. Thus, PBUF now stores the information shown in FIG. 8b. After the transfer is complete, as established by block 504, subroutine 505 of FIG. 6 calculates again the variables BITS-WIDE through VPOS used in establishing the parameters to be stored in CMBUF. That is, the parameters M2, M3, M6 and M7 are specifically calculated for each bit map transfer.

In this particular instance, the variable BITS-WIDE equals eight times the variable L. Therefore, BITS-WIDE is set to the value of 24 (i.e., 8×3). As before, the variable NUM-LINES is set to 8 and also as before, the variable HPOS is set to the value 38. Since YPOS now has the value of 8, VPOS is set to the value of 38.

As before, since the dots per inch is still 150, constant MAG remains at 2. The LOAD CMBUF subroutine 609 carries out the generation of the required ASCII byte strings in the same way as previously described. In this instance, the variable M2 is set to 24 bits (3 bytes), while the parameter M3 remains at eight scan lines. The parameter M7 is also set to 38 (i.e., VPOS).

Control now returns back to block 610 of FIG. 6 then to block 506 of FIG. 5 which transfers the contents of CMBUF and PBUF to printer 105. Thereafter, the subroutine sequences to block 507 which returns control back to block 306 of FIG. 3. Block 306 sets the variable PREVIOUS to WHITE and sets the variable KBEGIN equal to K. It then proceeds to block 309 which updates K by incrementing it to 5 and setting KEND to 5. Since testing by block 310 determines that K is still less than the variable BYTES-LINE, control proceeds back to block 302.

Since cell matrix 5 also is WHITE, program flow proceeds from block 303 to block 304. With the variable PREVIOUS having been set to WHITE, program flow continues through blocks 309, 310 and back to block 302. Block 302 detects that cell matrix 6 contains BLACK data. Therefore, block 303 passes control to block 307 based on the state of the variable PRESENT being BLACK. Block 307 passes control to block 308 based on the state of variable PREVIOUS being WHITE. Block 308 marks next the beginning of BLACK data by setting KBEGIN equal to K. The variable PREVIOUS is also set to BLACK and block 308 sequences control to block 309. Block 309 increments the variable K, sets KEND equal to K and control process to block 310.

Since K is still less than the variable BYTES-LINE, program flow returns back to block 302 and the same sequence of operations are repeated for cell matrices 7 and 8. When block 310 detects that K equals BYTES-LINE indicating that the image data contained in input buffer has been completely processed, program flow sequences to block 311. Since block 311 detects that the variable PREVIOUS was set to BLACK, program flow sequences to the transfer bit subroutine 305. This subroutine transfers the second bit map representation identified by the variables KBEGIN through KEND in the same manner as previously described.

Referring to FIG. 5, block 501, 502, 503 and 504 are executed as described before. The subroutine 505 of FIG. 6 again calculates the variables BITS-WIDE through VPOS as before. However, in this case, the variable HPOS is set to its previous value which was 38 plus the value defined by KBEGIN, which equals six (i.e., start of cell matrix 6) times the constant INC 720 divided by the constant DPI which is 150. This yields a value for HPOS of 230. Since the number of rows of block/row segment are the same as before, VPOS remains at the value 38.

The LOAD CMBUF subroutine 609 generates the required ASCII byte strings in the manner previously described. The resulting parameter values are stored in CMBUF as shown in FIG. 8c. Thereafter, control is returned to block 506 which transfers the contents of CMBUF and PBUF to printer 105. The program flow sequences to block 313 which returns control to block 210 of FIG. 2. Again, block 210 sets variable HPOS to zero and increments variable YPOS by eight for processing the next eight horizontal scan lines of data. Block 211 increments the value R by one which is tested by block 207. Assuming that NUM-LINES has the value 2, the result is that block 212 closes the files and terminates the driver program.

Printer 105, upon detecting that its buffer memory now contains all of the image data which is to be printed, prints out the BLACK and WHITE dots corresponding to the transferred bit map representations. This results in the image of FIG. 7 being reproduced.

From the above example, it is seen how the program implemented method of the present invention is able to reduce substantially printer buffer memory size requirements, in addition to reducing image data transfer time. Additionally, the present invention utilizes a standard interface which is easily modified to accommodate different types of printer requirements. Thus, there is no need to have to make any modifications to the printers or other output devices which reproduce the complex picture or graphics images from the bit map representations transmitted by the driver program.

The method of the present invention has been described in terms of a driver program. To prevent undue burdening, the description with matter within the ken of those skilled in the art, a block diagram approach has been followed, with a detailed functional description of each block. The individual programmer is free to select the individual subroutine and system components from the individual's own background or standard references. However, for the sake of completeness, an appendix includes statements in the C programming language of a driver program which embodies the method of the present invention.

It will be appreciated that many variations on the method of the present invention will occur to those skilled in the art. For example, the method may be utilized on different types of computer systems and with different types of output devices where it becomes desirable to limit the amount of image data which must be transferred and stored by such output devices. Also, while the various steps carried out by the driver program are shown to occur in sequence, it will be appreciated that several steps are performable in parallel. Also, the method is not limited to any particular bit map size, image size, or to any specific formats or coding techniques. Further, it will be obvious that the method of the present invention may also be implemented by microprogramming or hardware as a matter of design choice.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

```
#define WHITE 0
#define BLACK -1
#define HEIGHT_INC 720.0*8.0
define WIDTH_INC 720.0*8.0 int pr_image(input, prntfptr, preal_hdr, image_size_bytes)

int input;
int prntfptr;
struct fileheader *preal_hdr;
long image_size_bytes;
{
int i, r, count, remainder, num_lines;
int dots_inch;
float xpos, ypos;
char buff[8*320];

/* Start image in upper left hand coner */
xpos = 0.;
ypos = 0.;
dots_inch = preal_hdr->bin_data.element.horiz_dpi;

/*---- calculate number of rows of eight and reaminder */ num_lines = (preal_hdr->bin_data.element.numb_lines)/8;
num_lines = 8*num_lines;
remainder =.(preal_hdr->bin_data.element.numb_lines) % 8;
if (num_lines == 0) goto REMAINING;

for (r=0; r<num_lines; r = r + 8)
 {
 count = 8 * (preal_hdr->bin_data.element.bytes_line);
 read (input, buff, count);
```

```
        if (comp == 0) for (i=0; i<count; i++) buff[i] = ~buff[i];
           pp_cell (buff, prntfptr,
              preal_hdr->bin_data.element.bytes_line, xpos, ypos,
           dots_inch);
        ypos = ypos + HEIGHT_INC/((float)dots_inch);
        }

REMAINING:

if (remainder == 0) return(0);
        for (r=0; r<(8*320); r++) buff[r]='\0';   /*  White out buffer  */
        read (input, buff, remainder);
        if (comp == 0) for (i=0; i<count; i++) buff[i] = ~buff[i];
        pp_cell (buff, prntfptr,
         preal_hdr->bin_data.element.bytes_line,
            xpos, ypos, dots_inch);
        ypos = ypos + HEIGHT_INC;
        return(0);
        int pp_cell (pbuff, prntfptr, bytes_line, xpos, ypos, dpi)

char *pbuff;
        int prntfptr;
        int bytes_line;
        float xpos, ypos;
        int dpi;
        {
        char prbuff[8*320];
        int previous, len;
        int hpos, vpos;
        unsigned k_begin, k_end;
        unsigned i, j, k, lin;

/*  ---  Procedure begins ----  */ hpos = (int) xpos;
        vpos = (int) ypos;
        k_begin = k_end =0;
        printf ("."); /* show some action on screen */

/* Loop through a line of cells; where a line of cells = 8*bytes_line.
           All white cells are not printed and therefore skipped.
           During each line look for strings of black (i.e. not all white).
           If the line turns from black to white, go back & print black.
           If a cell turns from white to black then it marks the beginning of
           (k_begin) a string of black.  k_end is end of black cells     */ previous = WHITE;
        for (k = 0; k < bytes_line; k++)    /* for cells in line */
          {
          if ( pbuff[k]              == 0x00 && /* if all white */
               pbuff[k+bytes_line]   == 0x00 &&
               pbuff[k+bytes_line*2] == 0x00 &&
               pbuff[k+bytes_line*3] == 0x00 &&
               pbuff[k+bytes_line*4] == 0x00 &&
               pbuff[k+bytes_line*5] == 0x00 &&
               pbuff[k+bytes_line*6] == 0x00 &&
               pbuff[k+bytes_line*7] == 0x00   )
             {
             if (previous == WHITE)
                {       /* this & previous are white. B -> W */
                k_begin = k;
                k_end = k;
                previous = WHITE;
                }
             if (previous == BLACK)
                {    /*       B -> W
```

```
                k_end = k - 1;
                len = k_end - k_begin +1;
                if (len > bytes_line) Printf ("\n Error sys 0 len= %d\n",len);
                /*-- copy eight lines into a print buffer -- */
                for (j = 0; j < len; j++)
                    {
                    prbuff [j]       =pbuff [k_begin + j];
                    prbuff [j+len*1] =pbuff [k_begin + j + bytes_line*1];
                    prbuff [j+len*2] =pbuff [k_begin + j + bytes_line*2];
                    prbuff [j+len*3] =pbuff [k_begin + j + bytes_line*3];
                    prbuff [j+len*4] =pbuff [k_begin + j + bytes_line*4];
                    prbuff [j+len*5] =pbuff [k_begin + j + bytes_line*5];
                    prbuff [j+len*6] =pbuff [k_begin + j + bytes_line*6];
                    prbuff [j+len*7] =pbuff [k_begin + j + bytes_line*7];
                    }
                hpos = (int)(xpos + (float)k_begin*WIDTH_INC/((float)dpi));
                vpos = (int) ypos;
                pre_print(prntfptr, len, 8, dpi, hpos, vpos );
                pr_out (prbuff, len*8, prntfptr);
                k_begin = k;
                k_end = k;
                previous = WHITE;
                }
            }
        else /* this cell is BLACK */
            {
            if (previous == WHITE)
                {    /* This is black & prev is white. W -> B */
                k_begin = k;
                k_end = k;
                previous = BLACK;
                }
            else
                {   /* This & prev are black  B -> B  */
                k_end =k;
                previous = BLACK;
                }
            }
        }  /* End of row of cells  */

/* check for left over unprinted black cells */ if (previous == BLACK)
        {
        k_end = bytes_line - 1;
        len = k_end - k_begin +1;
        if (len > bytes_line) Printf ("\n Error sys 2 len= %d\n",len);
        /*-- copy eight lines into a print buffer -- */
        for (j = 0; j < len; j++)
            {
            prbuff [j]       =pbuff [k_begin + j];
            prbuff [j+len*1] =pbuff [k_begin + j + bytes_line*1];
            prbuff [j+len*2] =pbuff [k_begin + j + bytes_line*2];
            prbuff [j+len*3] =pbuff [k_begin + j + bytes_line*3];
            prbuff [j+len*4] =pbuff [k_begin + j + bytes_line*4];
            prbuff [j+len*5] =pbuff [k_begin + j + bytes_line*5];
            prbuff [j+len*6] =pbuff [k_begin + j + bytes_line*6];
            prbuff [j+len*7] =pbuff [k_begin + j + bytes_line*7];
            }
        hpos = (int)(xpos + (float)k_begin*WIDTH_INC/((float)dpi));
        vpos = (int) ypos;
        pre_print(prntfptr, len, 8, dpi, hpos, vpos );
        pr_out (prbuff, len*8, prntfptr);
```

What is claimed is:

1. A method of transferring a binary graphics or picture image stored in a random access memory (RAM) to an output device having less than a page of buffer memory, said image including a plurality of scan lines of dots or pixels, said method comprising the steps of:
   (a) scanning a row segment of said binary image at a time starting from a predetermined reference point in said memory, said row segment consisting of a predetermined plurality of scan lines of dots;
   (b) analyzing a predetermined increment of said row segment at a time in said memory for the presence of dot patterns containing essential data so as to divide said row segment into a number of increment long cell matrices;
   (c) generating position information signals for bit map representations containing said essential data patterns defined in step (b), each of said bit map representations having a vertical or height dimension equal to said predetermined plurality of scan lines and a horizontal or length dimension equal to a number of consecutive cell matrices detected as containing said essential data;
   (d) successively transferring to said output device, said position information signals followed by each of said bit map representations in said memory containing areas of said image to be reproduced; and,
   (e) repeating steps (a) through (d) for each row segment until said image has been processed.

2. The method of claim 1 wherein said essential data corresponds to binary "1" data.

3. The method of claim 1 wherein said increment corresponds to a byte.

4. The method of claim 1 wherein said step (d) further includes the steps of generating a corresponding number of transfer bit map commands, each including strings of bytes defining the format, size, horizontal and vertical positioning of said bit map representation.

5. The method of claim 1 wherein step (c) includes the steps of:
   generating a set of variables defining the positions of first and last consecutive cell matrices containing essential data;
   transferring to an output area of memory, the binary image contents of said consecutive cell matrices specified by said set of variables for transfer as a single bit map representation to said device.

6. The method of claim 1 wherein step (b) further includes returning to step (a) upon detecting that none of said horizontal scan lines of said row segment contain an essential data.

7. A method of transferring a full page binary graphics or picture binary image stored in a random access memory (RAM) to a printer having less than a page of buffer memory, said image including a plurality of horizontal scan lines of dots or pixels corresponding to said full page, said method comprising the steps of:
   (a) scanning a row segment of said binary image at a time starting from a predetermined reference point in said memory, said row segment consisting of a predetermined plurality of horizontal scan lines of dots;
   (b) analyzing a byte of said row segment at a time for the presence of dot patterns containing essential data so as to divide said row segment into a number of byte long cell matrices;
   (c) generating horizontal and vertical position signals for bit map representations containing said essential data patterns defined in step (b), each of said bit map representations having a vertical or height dimension equal to said predetermined plurality of horizontal scan lines and a horizontal or length dimension equal to a number of consecutive cell matrices detected as containing said essential data;
   (d) successively transferring to said output printer, said position signals followed by said corresponding ones of bit map representations in said RAM containing areas of said image to be printed; and,
   (e) repeating steps (a) through (d) for each row segment until said full image has been processed.

8. The method of claim 7 wherein said essential data corresponds to binary "1" data.

9. The method of claim 7 wherein step (d) further includes steps of generating from said position signals a corresponding number of transfer bit map commands, each including strings of bytes defining the format, size, horizontal and vertical positioning of said bit map representation.

10. The method of claim 7 wherein step (c) includes the steps of:
    generating a set of variables defining first and last consecutive cell matrices containing essential data;
    transferring to an output area of memory, the binary image contents of said consecutive cell matrices specified by said set of variables for transfer as a single bit map representation to said printer.

11. The method of claim 7 wherein step (b) further includes returning to step (a) upon detecting that none said horizontal scan lines of said row segment contain an essential data.

12. A system for transferring a full page of binary graphics or picture image data to a laser printer having less than a full page of buffer image storage, said image including a plurality of horizontal scan lines of binary 1 and 0 dot patterns representative of said image, said system comprising:
    a computer including a random access memory (RAM) and disk storage unit, said disk storage unit containing at least one file including binary data defining said image and said computer being coupled to said printer through a standard interface; and
    a driver program containing a plurality of subroutines, said driver program being stored on said disk storage, a first subroutine of said driver program in response to a command from said computer to print said image data being operative to read said file on said disk into said RAM, said file including a number of row segments of said image, each row segment consisting of a plurality of horizontal scan lines of binary dot patterns;
    a second one of said plurality of subroutines scanning a predetermined increment of a first one of said number of row segments at a time thereby dividing said row segment into a number of cell matrices of equal length;
    said second one of said subroutines including test matrix means for detecting the presence of any binary 1 data within a cell matrix;
    create bit map means for defining the beginning and end of the number of consecutive cell matrices containing said binary 1 data; and transfer bit map means for transferring the image contents of said number of consecutive cell matrices containing said binary 1 data to an output buffer area of said RAM for subsequent transfer to said printer.

13. The system of claim 12 wherein said increment corresponds to a byte.

14. The system of claim 13 wherein said file further includes a header portion containing file format information defining the number of scan lines, the number of bytes per scan line and the number of dots per inch (DPI), said first subroutine including means for verifying that the format of said file defining said number of scan lines, number of bytes per scan line and DPI is compatible with the format of said printer.

15. The system of claim 13 wherein said row segment includes a plurality of said number of consecutive cell matrices containing binary 1 data, said create bit map means generating signals defining in succession said beginning and end of each of said number of consecutive cell matrices and associated horizontal and vertical positions; and said transfer bit map being operative to successively transfer said signals and said each of said number of consecutive cell matrices as defined by said create bit map means until all of said cell matrices of said row segment have been scanned.

16. The system of claim 15 wherein said number of row segments is greater than one and wherein said second subroutine is operative to scan each of said number of row segments corresponding to said image and transfer each of said number of consecutive cell matrices containing said binary 1 data to said output buffer area.

17. The system of claim 15 wherein said transfer bit map means includes:

means for generating parameter information including size, vertical and horizontal positioning information from said signals generated by said create bit map means for each of said number of consecutive cell matrices specific to said printer, and, means for transferring said parameter information together with each of said number of consecutive cell matrices as successive bit map transfer commands to said printer over said standard interface.

* * * * *